United States Patent Office 2,702,301
Patented Feb. 15, 1955

2,702,301

PRODUCTION OF COLORLESS SALTS OF ACI-NITRO COMPOUNDS

Otto von Schickh and Hans-Joachim Riedl, Ludwigshafen (Rhine), Germany, assignors to Badische Anilin- & Soda-Fabrik Aktiengesellschaft, Ludwigshafen am Rhine, Germany No Drawing. Application March 4, 1954,
Serial No. 414,222

Claims priority, application Germany March 6, 1953

6 Claims. (Cl. 260—500)

This invention relates to an improved process for the production of colorless salts of aci-nitro compounds.

More or less discolored solutions are often obtained by dissolving secondary cycloaliphatic nitro compounds in aqueous alkali solutions, especially when technical-grade products and apparatus are used. The impurities causing the discoloration are a nuisance in the further processing, for example to oximes.

We have now found that pure colorless salts of aci-nitro compounds or solutions of such salts can be obtained also from technical initial materials by preventing the action of atmospheric oxygen and/or adding small amounts of reducing agents during the reaction of the secondary cycloaliphatic nitro compounds with alkali solutions, ammonia or alkaline earth hydroxides.

Suitable cycloaliphatic nitro compounds are, for example, nitrocyclopentane, -hexane, -heptane and -octane and their alkyl homologues, such as mono- and dimethylnitrocyclohexanes.

The action of atmospheric oxygen is prevented for example by working in an inert atmosphere, such as nitrogen or hydrogen, or by the addition of small amounts of antioxidants or inhibitors. Among such agents, reducing agents, such as hydroxylamine, sulfites or hydrosulfites, are especially suitable.

When agents of the aforesaid type are added, the exclusion of air is generally unnecessary. It is then possible also to work in iron vessels, whereas hitherto an especially marked discoloration has been observed when using vessels made of the said material.

The amount of reducing agent necessary for the production of colorless solutions may be about 0.1 to 10% by weight, depending on the purity of the nitro compound; the amount can readily be determined by preliminary experiments.

The following examples will further illustrate this invention, but the invention is not restricted to these examples. The parts are parts by weight.

Example 1

258 parts of technical-grade nitrocyclohexane and 940 parts of 9% caustic soda solution are stirred in an iron stirring vessel at room temperature with the addition of 9 parts of sodium sulfite. Small amounts of volatile, insoluble constituents are expelled with steam, and a clear limpid solution is obtained from which pure colorless cyclohexanone oxime can be recovered, for example by introduction into acid hydroxylammonium salt solution.

On the other hand, if the same treatment is carried out without the addition of sodium sulfite, there separate from the solution, even after it has been blown with steam, insoluble dark-colored oily to resinous constituents, and by reaction with acid hydroxylammonium salt solutions yellow to brown colored cyclohexanone oxime is obtained. The discoloration and the amount of the insoluble constituents is less when working with the exclusion of air, as for example in a nitrogen atmosphere.

Example 2

230 parts of technical-grade nitrocyclopentane are dissolved in 940 parts of 9% caustic soda solution in an iron stirring vessel at between 20° and 30° C. with 6 parts of sodium sulfite being added. The solution is then heated to boiling at reduced pressure until all of the volatile, water-insoluble constituents have passed. The clear and almost colorless solution obtained, on being entered into a hydroxylammonium salt solution containing an excess of acid, yields pure colorless cyclopentanone oxime.

6 parts of sodium hydrosulfite or 4 parts of hydroxylamine as an addition in the form of an aqueous solution will give the same good result as sodium sulfite. If, however, the technical-grade nitrocyclopentane is dissolved in caustic soda solution in the absence of any such additive, there will be similar troubles as those described in Example 1.

Example 3

286 parts of technical-grade 1-methyl-3-nitrocyclohexane are dissolved in 940 parts of 9% caustic soda solution in an iron stirring vessel at between 20° and 30° C. with 9 parts of sodium hydrosulfite being added. The water-insoluble, volatile by-products are then removed as described in Example 1. There is obtained a clear, colorless solution which, when entered in an acid solution of hydroxylammonium salt, yields a pure, colorless oxime.

In the absence of sodium hydrosulfite the solution rapidly undergoes discoloration and yields an impure oxime.

Example 4

214 parts of technical-grade nitrocyclooctane are dissolved in 940 parts of 12.6% caustic potash solution in an iron stirring vessel at about 30° C. with 12 parts of potassium sulfite being added. After expelling small quantities of water-insoluble, volatile by-products by means of steam, a clear and almost colorless solution is obtained.

Example 5

230 parts of technical-grade nitrocyclopentane are dissolved at ambient temperature in 735 parts of a 12.1 normal aqueous solution of ammonia which contains 8 parts of ammonium sulfite. After stripping small quantities of insoluble matter, a practically colorless solution is obtained which can be processed with advantage into cyclopentanone oxime and ammonium sulfate. In the absence of ammonium sulfite the solution undergoes discoloration which intensifies as the operation proceeds.

We claim:

1. In the production of almost colorless limpid solutions of water-soluble salts of aci-nitro compounds by dissolving secondary cycloaliphatic nitro hydrocarbon in an aqueous solution containing an alkaline agent selected from the group consisting of alkali metal hydroxides, alkaline earth metal hydroxides and ammonia the step which comprises adding from about 0.1 to 10% by weight of a reducing agent selected from the group consisting of hydroxylamine and water-soluble sulfites and hydrosulfites.

2. A process for the production of an almost colorless limpid aqueous solution of the sodium salt of aci-nitrocyclohexane which consists in introducing technical nitrocyclohexane at substantially normal temperature into an aqueous caustic soda solution containing from about 0.1 to 10% of sodium sulfite.

3. A process for the production of an almost colorless limpid aqueous solution of the sodium salt of aci-nitrocyclopentane which consists in introducing technical nitrocyclopentane at substantially normal temperature into an aqueous caustic soda solution containing from about 0.1 to 10% of hydroxylamine.

4. A process for the production of an almost colorless limpid aqueous solution of the sodium salt of aci-nitrocyclopentane which consists in introducing technical nitrocyclopentane at substantially normal temperature into an aqueous caustic soda solution containing from about 0.1 to 10% of sodium sulfite.

5. A process for the production of an almost colorless limpid aqueous solution of the potassium salt of aci-nitrocyclooctane which consists in introducing technical nitrocyclooctane into an aqueous caustic potash solution containing from about 0.1 to 10% of potassium sulfite.

6. A process for the production of an almost colorless limpid aqueous solution of the ammonium salt of aci-nitrocyclopentane which consists in introducing technical nitrocyclopentane into an aqueous ammonia solution containing from about 0.1 to 10% of ammonia sulfite.

No references cited.